(12) United States Patent
Xu et al.

(10) Patent No.: US 11,520,078 B2
(45) Date of Patent: Dec. 6, 2022

(54) METHOD FOR DETERMINING WHITE PLUME CONTROL LINE OF SMOKE AFTER WET DESULPHURIZATION

(71) Applicant: NANJING TECH UNIVERSITY, Jiangsu (CN)

(72) Inventors: Haitao Xu, Nanjing (CN); Changcheng Zhou, Nanjing (CN); Jianjun Jiang, Nanjing (CN); Qiang Li, Nanjing (CN); Jian Zou, Nanjing (CN); Kai Shen, Nanjing (CN); Da Shen, Nanjing (CN)

(73) Assignee: NANJING TECH UNIVERSITY, Nanjing (CN)

(*) Notice: Subject to any disclaimer, the term of this patent is extended or adjusted under 35 U.S.C. 154(b) by 487 days.

(21) Appl. No.: 16/611,363

(22) PCT Filed: Oct. 31, 2018

(86) PCT No.: PCT/CN2018/113002
§ 371 (c)(1),
(2) Date: Nov. 6, 2019

(87) PCT Pub. No.: WO2020/077679
PCT Pub. Date: Apr. 23, 2020

(65) Prior Publication Data
US 2020/0191998 A1    Jun. 18, 2020

(30) Foreign Application Priority Data

Oct. 18, 2018 (CN) .......................... 201811215860.1

(51) Int. Cl.
*G01W 1/10*        (2006.01)
*F23J 15/04*       (2006.01)

(52) U.S. Cl.
CPC .............. *G01W 1/10* (2013.01); *F23J 15/04* (2013.01); *F23J 2215/20* (2013.01)

(58) Field of Classification Search
CPC ......... G01W 1/10; F23J 15/04; F23J 2215/20; F23J 2900/15004; G05B 19/418
See application file for complete search history.

(56) References Cited

FOREIGN PATENT DOCUMENTS

| CN | 107344052 A | * 11/2017 | ............. B01D 50/00 |
| CN | 107344052 A | 11/2017 | |

(Continued)

OTHER PUBLICATIONS

CN-108930971-A_Translated (Year: 2018).*

(Continued)

*Primary Examiner* — Natalie Huls
*Assistant Examiner* — Michael J Singletary
(74) *Attorney, Agent, or Firm* — Oliff PLC (57) ABSTRACT

Determining a white plume control line of smoke after wet desulphurization includes: drawing a saturated air enthalpy humidity curve or equivalent; obtaining annual temperature and humidity change data of located cities or regions along with the time at the frequency of at least one datum every day; drawing the data obtained in the saturated air enthalpy humidity curve; and drawing a tangent line on the saturation curve by using each meteorological point in a chart, the right lower side of the tangent line is a de-pluming control region, the de-pluming effect superior to that at the feature meteorological point can be realized when the smoke enters the region after regulation, a region defined by the de-pluming control line and the saturation curve at a low-temperature side forms a de-pluming day number control region, and the point number falling within the region is the white plume generating day number.

11 Claims, 5 Drawing Sheets

(56) References Cited

FOREIGN PATENT DOCUMENTS

| CN | 108592068 A | * | 9/2018 |
| CN | 108592068 A | | 9/2018 |
| CN | 108930971 A | * | 12/2018 |
| GB | 1469829 A | | 4/1977 |
| KR | 20160074325 A | * | 6/2016 |

OTHER PUBLICATIONS

KR-20160074325-A_Translated (Year: 2016).*
CN-108592068-A_Translated (Year: 2018).*
CN-107344052-A_Translated (Year: 2017).*
Jul. 17, 2019 Search Report issued in International Patent Application No. PCT/CN2018/113002.
Jul. 17, 2019 Written Opinion issued in International Patent Application No. PCT/CN2018/113002.
Yutian, Liu et al., "Research on Calculating Method for Control Effect Evaluation of Wet Smoke Plume", vol. 36, pp. 859-862, (2018).

* cited by examiner

METHOD FOR DETERMINING WHITE PLUME CONTROL LINE OF SMOKE AFTER WET DESULPHURIZATION

BACKGROUND

Technical Field

The present invention belongs to the field of smoke purification, and particularly relates to a method for determining a white plume control line of smoke after wet desulphurization.

Related Art

With the implementation of ultralow emission of coal-fired power plants, pollutants such as particulate matters, $SO_2$ and $NO_x$ in smoke are effectively controlled to different degrees. However, the smoke after wet desulphurization has low temperature, and saturated wet smoke forms several hundred meters or even several kilometers of white plume in a process of being in contact with environment air and gradually cooling, causing visual pollution and great distress on the lives of surrounding residents; and meanwhile, high-humidity environment promotes secondary conversion of primary pollutants, a humidity inversion layer is formed to prevent further dispersion of the pollutants, which is one of sources of formation of local haze. By aiming at the phenomenon, some local environmental protection departments have introduced policies relevant to wet plume control. The standards introduced by major cities and regions are summarized as follows:

Shanghai

Shanghai Environmental Protection Bureau issued *Emission standards for Atmospheric Pollutants from Coal-fired Power Plants* (DB31/963-2016) on Jan. 29, 2016. It required that "smoke temperature control and other effective measures should be adopted for coal-fired power generating boilers so as to eliminate phenomena of gypsum rain, colored plume, etc.", and realized the normalized control on pollution brought therefrom through test enhancement.

http://www.sepb.gov.cn/fa/cms/shhj/shhj2024/shhj2038/2016/02/91580.htm

Shanghai Environmental Protection Bureau issued *Technical Requirements for Testing Gypsum Rain and Colored Plume in Coal-fired Power Plants in Shanghai (For Trial Implementation)* on Jun. 6, 2017. The application scope of the requirement was determined, the gypsum rain and colored plume were defined, the test requirements were provided in three aspects of smoke temperature test, colored plume observation and gypsum rain sedimentation test, and meanwhile, an evaluation standard was given.

http://www.sepb.gov.cn/fa/cms/xxgk/AC45/AC4508000/AC4508003/2017/06/96352.htm

Requirements: if a smoke heating technology is used, the emission smoke temperature should continuously and stably reach 75° C. or higher under normal work conditions, and the emission smoke temperature should continuously and stably reach 78° C. or higher in winter (November of each year to February of next year) and when heavy pollution early warning starts; if a smoke condensation reheating technology is used, and the equivalent gypsum rain and colored plume elimination effect can be reached, the emission smoke temperature should continuously and stably reach 54° C. or higher under the normal work conditions, and the emission smoke temperature should continuously and stably reach 56° C. or higher in winter and when heavy pollution early warning starts. Coal-fired power plants using smoke heating or smoke condensation reheating technology can be exempted from the test, but any unreasonable shutdown of relevant facilities is not allowed.

Zhejiang Province

Zhejiang Environmental Protection Bureaus issued a Zhejiang province mandatory local environment protection standard of *Emission Standards for Atmospheric Pollutants from Coal-fired Power Plants* (Exposure Draft) on Aug. 28, 2017. It required that "smoke temperature control and other effective measures should be adopted for coal-fired power generating boilers so as to eliminate phenomena of gypsum rain, colored plume, etc.", wherein power plants required to be governed were specified out, a measure of eliminating gypsum rain and colored plume through MGGH was provided, and the chimney outlet smoke temperature to be controlled by the technology was also given out.

http://www.zjepb.gov.cn/art/2017/8/28/art_1201983_13444986.html

Handan

Handan Leading Group Office for Atmospheric Pollution Prevention and Control issued *Suggestions on Implementation of Fugitive Emission Governance in Power Plants and Key Industries in Handan* (Handan Leading Group Office for Atmospheric Pollution Prevention and Control [2017] No. 112) on Oct. 16, 2017. It clearly specified that each kind of power enterprises should eliminate white plume from chimney before the end of December, 2017.

Tianjin

Tianjin Environmental Protection Bureau issued *Notice about Relevant Work of Further Strengthening Atmospheric Pollution Deep Governance in Key Industries of Thermal Power, Steel, etc. in Tianjin* on Oct. 21, 2017. It specified that "smoke temperature control and other effective measures should be adopted for boilers in several industries so as to eliminate phenomena of gypsum rain, colored plume, etc.", and clearly specified that relevant technologies should be adopted for coal-fired boilers, except for those equipped with WESP, and other facilities so as to reduce the smoke emission temperature and moisture content for eliminating phenomena of gypsum rain, colored plume, etc. *Definition of Gypsum Rain and Colored Plume* was given in appendixes.

Xuzhou

*Jiangsu Province Atmospheric Pollution Prevention and Control Regulation* specified clear requirements on implementation of ultralow emission of coal-fired boilers. *Notice about Promoting Implementation of Atmospheric Pollutant Ultralow Emission Demonstration Project on Coal-Fired Power Generating Units* was issued. According to information, smoke temperature emission requirements are under formulation, and specific emission temperature requirements will be issued in 2018.

Xuzhou People's Government Office issued *Notice about Accelerating Smoke Comprehensive Governance in Coal-Fired Power Generating Enterprises in Xuzhou*. It required that before the end of July in this year, the power enterprises in Xuzhou should complete dehumidification, dust reduction and de-pluming projects, and the colored plume should be basically eliminated. According to the smoke comprehensive emission standard, in summer (April to October), the smoke temperature reaches 47° C. or lower after condensation, and the smoke moisture content is 10.4% or lower; and in winter (November to March of next year), the smoke temperature reaches 45° C. or lower after condensation, and the smoke moisture content is 9.5% or lower.

Therefore, China is a large country with quiet different meteorological conditions and coal firing conditions in each region, and regulations in each region are different, so that it is important to use a scientific method for determining a de-pluming control line of smoke after wet desulphurization.

SUMMARY

The present invention provides a method for determining a white plume control line of smoke after wet desulphurization by aiming at the above-mentioned existing problems.

The Objectives of the Present Invention can be Achieved by the Following Technical Scheme:

The method for determining the white plume control line of smoke after wet desulphurization includes the following steps:

First Step, determining a control line according to a following method:

Step 1, drawing a saturated air enthalpy humidity curve or an equivalent curve;

Step 2, obtaining temperature and relative humidity change data of located cities or regions along with the time at the frequency of at least one datum every day, wherein the sum of data collected every day is p, the data collection day number is m, and the sum of collected data is m*p;

Step 3, drawing the data obtained in the Step 2 in the saturated air enthalpy humidity curve obtained in the Step 1, and correspondingly obtaining corresponding meteorological points;

Step 4, drawing tangent lines on the saturated air enthalpy humidity curve by using the meteorological points obtained in the Step 3;

Step 5, ranking the slope of each tangent line obtained in the Step 4 in an increasing order, wherein the serial numbers are sequentially 0, 1, 2, . . . , m*p−1; wherein the serial number of the magnitude of any one slope is defined to be n, and n is greater than or equal to 0 but smaller than or equal to m*p−1;

Step 6, determining a control line according to the slopes obtained in the Step 5, wherein according to (m*p−n)/(m*p)*100, control lines with different values can be obtained; the tangent line with the smallest slope is the strictest white plume control line, the de-pluming day number control region corresponding to the state is a 100% white-plume-free day number control region, and the corresponding tangent line is the 100% white-plume-free day number control line;

Second Step, designing condensing and temperature rise capability of a desulfurization tower device;

Definition: a critical point D is a smoke parameter point of an intersection point of the control lines with different values and the saturated air enthalpy humidity curve;

Definition: a point A is a smoke parameter point of an initial state of a wet desulphurization device for emitting wet smoke;

Definition: a point B is any one smoke parameter point between the point A and the critical meteorological point D in the saturated air enthalpy humidity curve, and this point is the smoke parameter design point with the lowest device operation energy consumption.

The parameter design point with the lowest device operation energy consumption is a lowest cost combination of the cost required for temperature lowering of the device to the point B and the cost required for temperature rise of the device to the control lines with different values;

Definition: the condensation capability of the desulphurization tower device refers to temperature required for temperature lowering from the point A to the point B in the saturated air enthalpy humidity curve; and the temperature rise capability of the desulphurization tower device refers to temperature required for temperature rise of the point B to the control lines with different values in the saturated air enthalpy humidity curve;

Third Step, a method for regulating white plume of smoke after wet desulphurization by the control lines, wherein the method concretely includes the following steps of:

Step 1, drawing a tangent line on the saturated air enthalpy humidity curve by using an environment meteorological point, wherein the tangent line is an environment meteorological tangent line; and Step 2, taking a point B' as a smoke parameter point with the lowest device operation energy consumption, wherein the point B' is any one meteorological data point between the point A and the critical meteorological point D in the saturated air enthalpy humidity curve.

The smoke parameter point with the lowest device operation energy consumption is the lowest cost combination of the cost required for temperature lowering of the device to the point B' and the cost required for temperature rise of the device to the environment meteorological tangent line.

In the technical scheme adopted by the present invention, the saturated air enthalpy humidity curve in the Step 1 takes temperature as the horizontal coordinate, and takes steam partial pressure as the vertical coordinate; and the equivalent curve is a curve drawn by taking temperature as the horizontal coordinate and taking relative humidity or moisture content as the vertical coordinate.

In the technical scheme adopted by the present invention, the data collection time in the Step 2 is longer than or equal to 1 calendar year.

In the technical scheme adopted by the present invention, the data collection time in the Step 2 is 1 to 5 calendar years.

In the technical scheme adopted by the present invention, the data collection time in the Step 2 is from October of each year to April of next year.

In the technical scheme adopted by the present invention, p data are collected every day in Step 2, wherein the p is greater than or equal to 1, and the collection time interval of each datum is (24/p)h.

In the technical scheme adopted by the present invention, p data are collected every day in Step 2, and p is greater than or equal to 20 but smaller than or equal to 80.

In the technical scheme adopted by the present invention, p data collected every day in Step 2 are screened by a method with the following steps:

Step a, drawing the saturated air enthalpy humidity curve or the equivalent curve;

Step b, drawing the p data collected every day into the saturated air enthalpy humidity curve obtained in the Step a to obtain corresponding meteorological points;

Step c, drawing tangent lines on the saturated air enthalpy humidity curve by using the meteorological points obtained in the Step b; and Step d, ranking the slope of each tangent line obtained in the Step c in an increasing order, and selecting the meteorological point datum with the smallest slope as the datum of that day.

In the technical scheme adopted by the present invention, a region where the tangent line and the right lower side of the tangent line are located is a de-pluming control region, de-pluming can be realized when original smoke enters the region after temperature and humidity regulation; a region defined by the de-pluming control line and the saturation curve at a low-temperature side forms a de-pluming day number control region, and the point number falling within the region is the white plume generating day number; and the de-pluming for the day number at different proportions can be realized by regulating different slopes.

Figure 1:
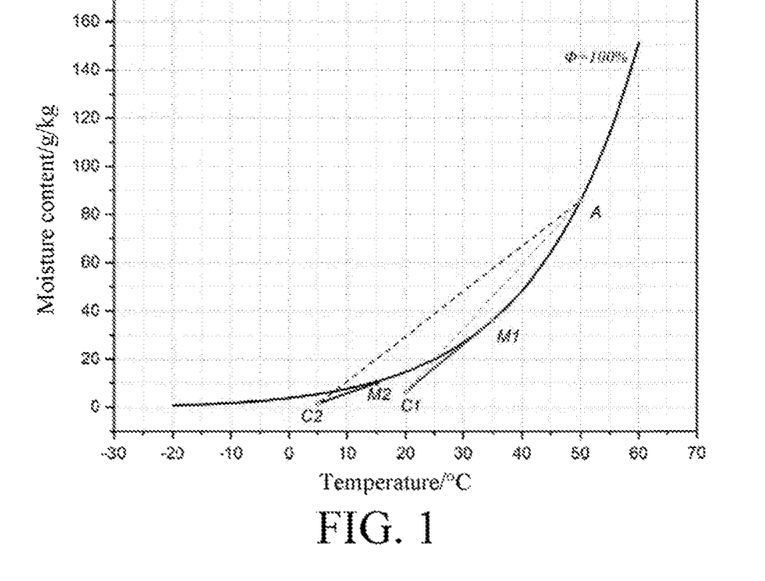
FIG. 1 is a schematic diagram of smoke de-pluming.

FIG. 1 is a schematic diagram of smoke de-pluming.

The smoke temperature of coal-fired power plant boilers after wet desulphurization is lowered to 45 to 55° C.; at this moment, the smoke is generally saturated wet smoke; and a great amount of steam is included in the smoke. If the smoke is directly emitted from a chimney to enter environment air with lower temperature, the smoke temperature is gradually lowered, and steam in the smoke is condensed to form wet plume.

The smoke moisture content refers to the mass (g) of the steam, coexisting with 1 kg of dry smoke, in the wet smoke, with the unit of g/kg dry smoke. At a certain temperature, the steam accommodating capability of the smoke is limited. In FIG. 1, a smoke emission and white plume forming process is shown on an enthalpy humidity diagram; the curve is a moisture content change curve of air with the relative humidity being 100% along with the temperature; the point A is an initial state (the smoke emission temperature after the wet desulfurization is generally saturated smoke being 45 to 60° C.) of the emitted wet smoke; points C1 and C2 are different environment air states, i.e., a final state of the smoke (according to the general atmospheric environment temperature in Jiangsu region); and tangent points M1 and M2 are respectively formed by drawing tangent lines of the saturation curve from C1 and C2. The smoke emitted from the chimney is continuously mixed with the smoke in the atmospheric environment. The capacity of the atmospheric environment is relatively large, so that it is generally regarded that the environment state point keeps unchanged (i.e., the points C1 and C2 in the figure), the smoke emitted from the chimney continuously approaches to the state of the atmospheric environment in the process of continuously mixing with the air. When the atmospheric environment is at the C1 state, the smoke A emitted from the chimney can continuously approach to a C1 state point, i.e., approaching along a connecting line of A to C1. In the change process from the point A to the point M1, local mixed gas of emitted smoke and the air (at this point, the emitted smoke should be regarded as a focused main body) is always in an oversaturated state, so that the steam in the saturated wet smoke generates phase change to be condensed into a liquid state when changing to the point M1 along the saturated humidity curve, condensed liquid is continuously produced, and moisture in the wet smoke is condensed into small liquid drips, namely the "white plume"; after the point M1 is passed, the local mixed gas of the emitted smoke and the air (at this point, the emitted smoke should be regarded as a focused main body) is in an unsaturated state, so that the temperature and the humidity of the emitted smoke gradually change to the environment temperature and humidity in the process of changing to the environment state point C1 from the point M1 along a straight line, the white plume disappears, so that the length of visible white plume depends on the length of the A-M1 saturation curve; and identically, the process of changing from the point A to the point C2 with lower environment temperature is similar, but the length of the white plume is longer. Therefore, whether white plume is generated after the wet smoke is emitted from the chimney and the length of the appeared white plume are relevant to the smoke temperature and the moisture content (the position of the point A), and are also relevant to the temperature and the humidity (i.e., the positions of the points C1 and C2) of the environment air. The "white plume" can be generated if the connecting line of the wet smoke initial state point and the environment state point intersects with the saturated humidity curve. The "white plume" is longer if the environment temperature is lower and the humidity is greater.

From the formation mechanism of the white plume, the connecting line of the wet smoke initial state point and the environment state point shall not intersect with the saturated humidity curve if the white plume needs to be eliminated, and the critical point is the tangent point of the connecting line of the wet smoke initial state point and the environment state point with the saturated humidity curve.

In the technical scheme adopted by the prevent invention, the de-pluming control mechanism depends on how to control the connecting line of the wet smoke initial state point and the environment state point not to intersect with the saturation humidity curve by certain temperature and humidity regulating measures. The tangent line is drawn on the saturation curve by using each meteorological point. The region at the right lower side of the tangent line is a de-pluming control region, and de-pluming effect superior to that at the feature meteorological point can be realized when the original smoke enters the region after regulation. The region defined by the de-pluming control line and the saturation curve at the low-temperature side forms the de-pluming day number control region, and the point number falling within the region is the white plume generating day number. The de-pluming for the day number at different proportions can be realized by regulating different slopes. Predictably, for a series of tangent line clusters formed by meteorological data in a specific range, the tangent line with the smallest slope is the strictest white plume control line. The de-pluming day number control region corresponding to this state is the 100% white-plume-free day number control region, the corresponding tangent line is the 100% white-plume-free day number control line, and no meteorological data point exists inside the de-pluming day number control region at this state.

Figure 7:
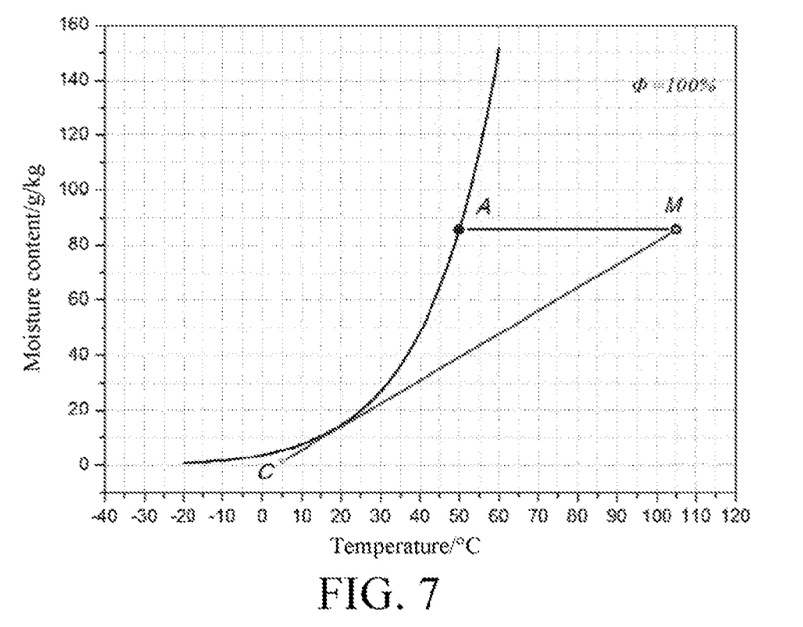
FIG. 7 is a de-pluming critical point calculation diagram.

De-pluming critical point calculation: as shown in FIG. 7, the point C state $(x_c, y_c)$ and the point A state $(x_a, y_a)$ are known (wherein the point C refers to environment temperature and humidity, and the point A refers to smoke temperature and humidity), and the point M state $(x_m, y_m)$ is solved, wherein the point M is the critical point of not generating white plume after the smoke and the air is mixed.

The tangent line of the curve Φ-t is drawn in a way of passing through the point C, and a line parallel to the axis X is drawn in a way of passing through the point A, wherein the intersection point is the point M, and the tangent point of CM and the curve is $D(x_d, y_d)$.

Curve Φ-t equation:

$$y=f(x)$$

Straight line CM equation:

$$y-y_c=(x-x_c)f'(x_d)$$

The point D is located on the curve Φ-t and the straight line CM:

$$y_d=f(x_d)$$

$$y_d-y_c=(x_d-x_c)f'(x_d)$$

By eliminating $y_c$, an equation with one unknown quantity about $x_c$ is obtained:

$$f(x_d)-x_df'(x_d)=x_cf'(x_d)-y_c=0,$$

set $F(x)=f(x)-xf'(x)=x_c f'(x)-y_c$, solve the root $x_d$ of $F(x)=0$ by a Newton iteration method.

$$x_1=x_c$$

$$x_{n+1}=x_n-F(x_n)/F'(x_n)$$

$$y_m=y_a$$

$$x_m=x_c+(y_a-y_c)/f'(x_d)$$

Beneficial Effects of the Present Invention:

A method for scientifically determining a de-pluming control line of smoke after wet desulphurization has the beneficial effects that:

1. meteorological data and smoke emission parameters over the years can be favorably sorted, the scientific white plume control objective and the economic and reasonable temperature point control path of a condensing-temperature rise process are determined, and the decision and design basis is provided for project construction.

2. for constructed projects, an optimum condensing-temperature rise temperature control point can be determined according to the de-pluming control line by combining with the practical meteorological data and smoke emission parameters, the operation cost is reduced, and the de-pluming effect is improved.

DETAILED DESCRIPTION

The following further describes the present invention with reference to the embodiments, but the protection scope of the present invention is not limited thereto:

Embodiment 1

Figure 2:
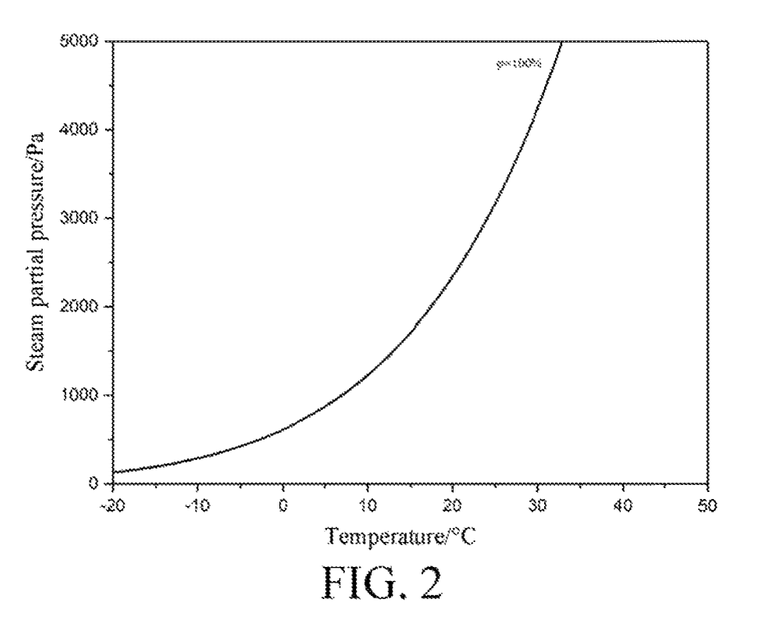
FIG. 2 is a drawn saturated air enthalpy humidity curve.
Figure 3:
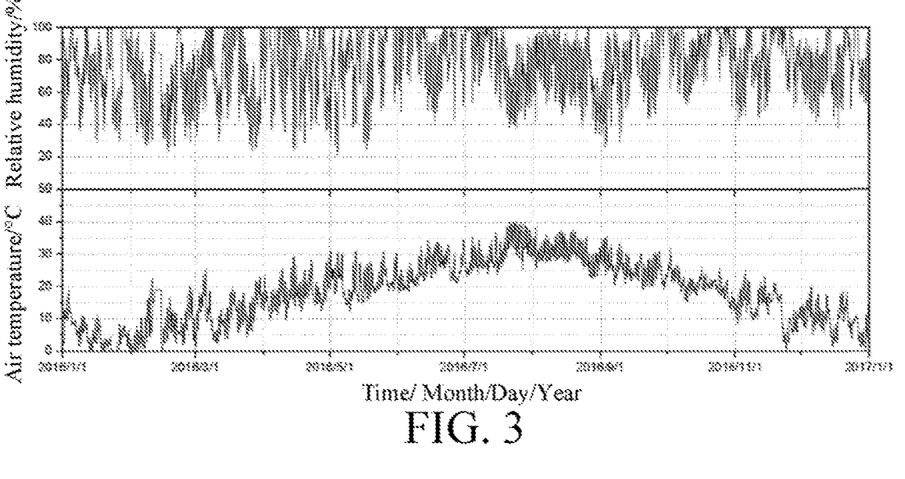
FIG. 3 is temperature and humidity change data along with the time collected for a year according to Embodiment 1 of the present invention.
Figure 4:
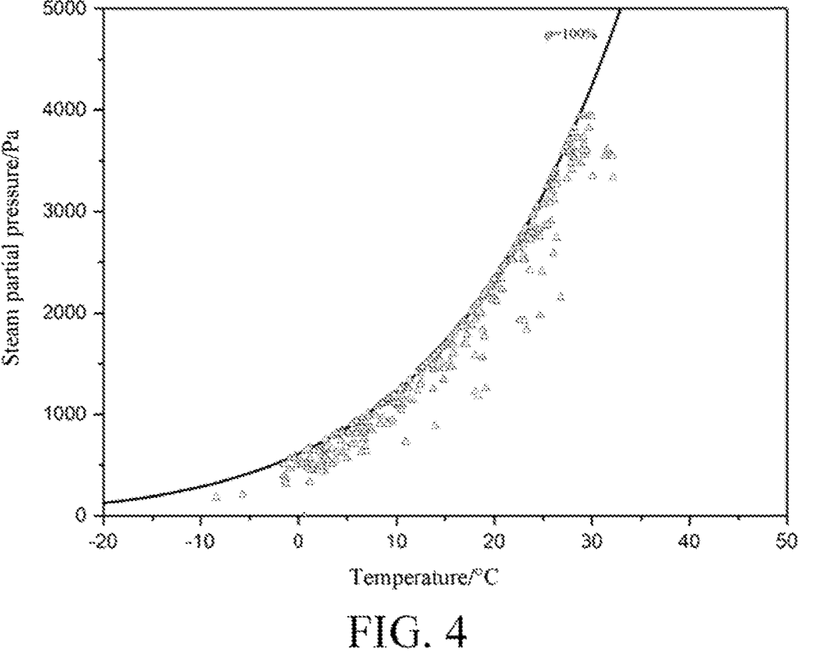
FIG. 4 is a diagram obtained after drawing obtained data on the saturated air enthalpy humidity curve.

A method for determining a white plume control line of smoke after wet desulphurization, including the following steps of:

First Step: a control line is determined by a method including the steps of:

Step 1, a saturated air enthalpy humidity curve is drawn, as shown in FIG. 2;

Step 2, temperature and humidity change data of located cities or regions along with the time in one year is obtained at the frequency of at least one datum every day, as shown in FIG. 3, wherein in the present embodiment, 48 data are collected every day, and the interval time of each datum is 30 min;

Step 3, the data obtained in the Step 2 is drawn in the saturated air enthalpy humidity curve obtained in the Step 1, as shown in FIG. 4.

Figure 5:
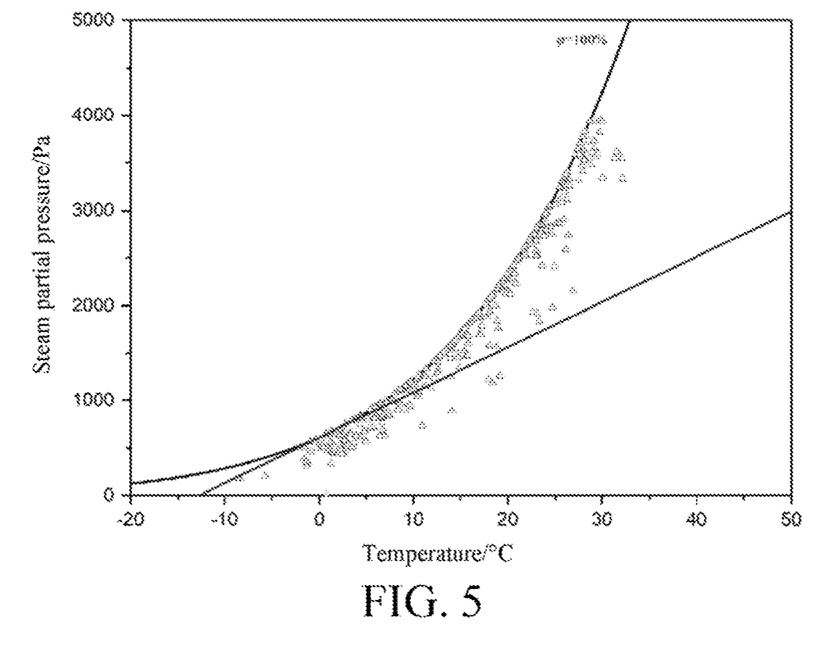
FIG. 5 is a diagram obtained by drawing tangent lines on the saturation curve by using each meteorological point in the diagram.

Step 4, the tangent line on the saturation curve is drawn by using each meteorological point in the diagram obtained in the Step 3, wherein a region at the right lower side of the tangent line is a de-pluming control region, the de-pluming effect superior to that at the feature meteorological point can be realized when the smoke enters the region after regulation, a de-pluming day number control region is formed at a region defined by the de-pluming control line and the saturation curve at a low-temperature side, and the point number falling within the region is the white plume generating day number, as shown in FIG. 5.

Step 5, slopes obtained in the Step 4 is ranked in a decreasing order, as shown in Table 1, wherein serial number refers to the natural series number of the data, does not change along with the ranking of subsequent lines, starts from 0, 1, 2, . . . , and also refers to the white-plume-free day number;

calendar serial number refers the corresponding calendar day number, for example, January 1 is the calendar serial number 1, January 2 is the calendar serial number 2, January 3 is the calendar serial number 3, and so on;

daily smallest slope and intercept refer to the slope and the intercept of the tangent line obtained in the Step 4, the equation can be determined according to the slope and the intercept of the tangent line, and when the datum of each day is only one, the daily smallest slope and intercept only refer to the slope and the intercept obtained by drawing the tangent line on the saturation curve by using the data point; and when a plurality of data is collected in one day, the tangent line is drawn on each data point, the smallest number of the obtained slope is the daily smallest slope, and the intercept of the corresponding tangent line is the intercept in the table.

temperature and humidity are the temperature and the humidity corresponding to the daily smallest slope in the day of the calendar serial number in the second column;

steam partial pressure (Pa) is the steam partial pressure converted according to the obtained relative humidity (%), and is concretely obtained by multiplying the relative humidity (%) by the saturated steam pressure corresponding to the corresponding temperature; and control line is the proportion of the white-plume-free day number in the total day number in a whole year, wherein the data line with the serial number being 0 is a 100% control line, the data line with the greatest serial number is a 0% control line, and other data lines are converted in the same way;

Step 6, the control line is determined according to the serial number in the Step 5 according to the time without the need of white plume control, see the above.

By taking the 100% control line as an example, after the p point slopes in each day are ranked, the daily smallest slope is obtained, the smallest slope datum in one year is ranked in Table 1, the annual smallest slope (critical meteorological point) is 47.65, the corresponding temperature is 1.1° C., the relative humidity is 100%, a tangent line drawn on the saturation curve by using this point is the 100% white-plume-free control line, and by that analogy, the white plume control lines with different control degrees can be obtained; and Step 7, process design is performed according to the control lines obtained in the Step 6.

TABLE 1

| Serial number | Calendar serial number | Daily smallest slope | Intercept | Temperature (° C.) | Relative humidity (%) | Steam partial pressure (Pa) | Saturation steam pressure (Pa) | Control line |
|---|---|---|---|---|---|---|---|---|
| 0 | 22 | 47.65023 | 609.0492 | 1.103385 | 100 | 661.6259 | 661.6259 | 100% |
| 1 | 21 | 48.10493 | 608.5079 | 1.252419 | 100 | 668.7556 | 668.7556 | |
| 2 | 31 | 48.30593 | 608.2471 | −0.37961 | 99.27024 | 589.93 | 594.2667 | |
| 3 | 23 | 48.3414 | 608.1997 | 0.671875 | 99.89468 | 640.6857 | 641.3612 | |
| 4 | 32 | 48.89075 | 607.4137 | −0.96038 | 98.40625 | 560.515 | 569.5929 | |
| 5 | 24 | 50.58843 | 604.3744 | −8.42188 | 55.02408 | 178.4075 | 324.2353 | |
| 6 | 35 | 54.13844 | 595.1369 | −0.48438 | 96.46875 | 568.9216 | 589.7471 | |
| 7 | 34 | 54.56807 | 593.7626 | −1.57813 | 93.26563 | 507.6909 | 544.3493 | |
| 8 | 328 | 55.02639 | 592.2369 | 2.805539 | 99.92188 | 746.6242 | 747.2079 | |
| 9 | 69 | 55.58119 | 590.3083 | 3.543739 | 100 | 787.2737 | 787.2737 | |
| 10 | 74 | 56.87881 | 585.4526 | 3.914082 | 100 | 808.0811 | 808.0811 | |
| 11 | 75 | 57.01711 | 584.9068 | 3.953125 | 100 | 810.3028 | 810.3028 | |
| 12 | 27 | 58.41684 | 579.0817 | 4.34375 | 100 | 832.8301 | 832.8301 | |
| 13 | 28 | 58.58678 | 578.3374 | 4.390629 | 100 | 835.5704 | 835.5704 | |
| 14 | 68 | 58.75713 | 577.5834 | 4.4375 | 100 | 838.3183 | 838.3183 | |
| 15 | 29 | 58.97414 | 576.6112 | 4.497042 | 100 | 841.8206 | 841.8206 | |
| 16 | 25 | 62.18092 | 560.7631 | −5.72183 | 51.4525 | 205.3936 | 399.1908 | |
| 17 | 54 | 62.74309 | 557.7039 | 5.502262 | 100 | 902.933 | 902.933 | |
| 18 | 53 | 63.47157 | 553.6178 | 5.690551 | 100 | 914.8062 | 914.8062 | |
| 19 | 80 | 64.48523 | 547.7053 | 5.949489 | 100 | 931.3597 | 931.3597 | |
| 20 | 11 | 66.12909 | 537.5644 | 3.924562 | 98.57813 | 797.1786 | 808.6769 | |
| 21 | 17 | 66.46495 | 535.4093 | 6.445296 | 100 | 963.7958 | 963.7958 | |
| 22 | 81 | 66.8134 | 533.1441 | 6.53125 | 100 | 969.5193 | 969.5193 | |
| 23 | 1 | 66.84436 | 532.9415 | 1.871358 | 94.12865 | 658.0524 | 699.0989 | |
| 24 | 30 | 67.18842 | 530.6729 | 1.67582 | 93.32843 | 643.3909 | 689.3836 | |
| 25 | 33 | 67.93108 | 525.6774 | −0.95313 | 80.88374 | 460.9526 | 569.8952 | |
| 26 | 329 | 68.86291 | 519.2203 | 0.361663 | 86.77896 | 544.2211 | 627.1348 | |
| 27 | 331 | 69.16047 | 517.1143 | 7.100401 | 100 | 1008.182 | 1008.182 | |
| 28 | 13 | 69.46543 | 514.9341 | −0.23438 | 83.07813 | 498.9536 | 600.5835 | |
| 29 | 14 | 70.31897 | 508.7145 | 0.237747 | 84.57476 | 525.6581 | 621.5307 | |
| 30 | 327 | 71.33773 | 501.0664 | 4.40625 | 97.4921 | 815.5072 | 836.4854 | |
| 31 | 12 | 71.53004 | 499.5955 | 2.440953 | 92.61425 | 674.3191 | 728.0944 | |
| 32 | 19 | 71.54348 | 499.4924 | −1.56592 | 71.15968 | 387.705 | 544.8381 | |
| 33 | 5 | 73.1391 | 486.9538 | 8.028456 | 100 | 1074.148 | 1074.148 | |
| 34 | 41 | 73.17883 | 486.6342 | 5.789981 | 98.82883 | 910.3435 | 921.1316 | |
| 35 | 55 | 74.1893 | 478.3842 | 2.128695 | 89.39063 | 636.5235 | 712.0696 | |
| 36 | 365 | 74.30446 | 477.4293 | 0.394591 | 80.62873 | 506.8576 | 628.6316 | 90% |
| 37 | 82 | 74.53462 | 475.5118 | 8.34375 | 100 | 1097.41 | 1097.41 | |
| 38 | 79 | 74.81395 | 473.169 | 8.40625 | 100 | 1102.074 | 1102.074 | |
| 39 | 18 | 75.48234 | 467.4922 | 1.187496 | 83.71875 | 557.2667 | 665.6414 | |
| 40 | 361 | 75.7373 | 465.3006 | 8.611445 | 100 | 1117.508 | 1117.508 | |
| 41 | 20 | 76.32359 | 460.2066 | −1.29688 | 65.06588 | 361.5818 | 555.7164 | |
| 42 | 26 | 76.70528 | 456.8497 | −1.47323 | 62.71875 | 344.0528 | 548.5645 | |
| 43 | 15 | 76.81166 | 455.9084 | 2.550016 | 88.86252 | 652.043 | 733.7661 | |
| 44 | 36 | 77.2332 | 452.1542 | 0.921875 | 80.16024 | 523.4734 | 653.0337 | |
| 45 | 66 | 77.45552 | 450.1585 | 8.987655 | 100 | 1146.302 | 1146.302 | |
| 46 | 348 | 77.49847 | 449.7718 | 8.996965 | 100 | 1147.023 | 1147.023 | |
| 47 | 352 | 77.51527 | 449.6205 | 2.8531 | 89.49066 | 670.9417 | 749.7338 | |
| 48 | 37 | 77.82428 | 446.825 | 0.819958 | 78.8125 | 510.9041 | 648.2526 | |
| 49 | 52 | 77.83832 | 446.6975 | 2.652988 | 88.40625 | 653.461 | 739.157 | |
| 50 | 354 | 77.85484 | 446.5474 | 9.074062 | 100 | 1153.007 | 1153.007 | |
| 51 | 355 | 78.09106 | 444.3949 | 9.125 | 100 | 1156.976 | 1156.976 | |
| 52 | 67 | 78.33036 | 442.2022 | 9.176467 | 100 | 1160.998 | 1160.998 | |
| 53 | 4 | 79.65865 | 429.808 | 9.459729 | 100 | 1183.357 | 1183.357 | |
| 54 | 46 | 80.7765 | 419.0877 | −1.3125 | 56.48438 | 313.5332 | 555.0794 | |
| 55 | 360 | 80.95297 | 417.3713 | 9.731892 | 100 | 1205.197 | 1205.197 | |
| 56 | 102 | 80.96486 | 417.2554 | 9.734375 | 100 | 1205.398 | 1205.398 | |
| 57 | 7 | 82.19406 | 405.1176 | 5.421879 | 94.76115 | 850.8658 | 897.9058 | |
| 58 | 16 | 82.32147 | 403.8416 | 2.328129 | 82.48438 | 595.7582 | 722.2679 | |
| 59 | 358 | 82.5265 | 401.7812 | 5.09029 | 93.67188 | 821.9038 | 877.4285 | |
| 60 | 76 | 82.97588 | 397.2351 | 7.122384 | 97.875 | 988.2456 | 1009.702 | |
| 61 | 38 | 83.03275 | 396.6568 | 0.93402 | 72.5677 | 474.3064 | 653.6055 | |
| 62 | 363 | 83.0912 | 396.0618 | 1.35596 | 75.5088 | 508.7397 | 673.7489 | |
| 63 | 77 | 84.53226 | 381.172 | 10.46562 | 100 | 1265.855 | 1265.855 | |
| 64 | 94 | 85.42307 | 371.7585 | 10.6441 | 100 | 1281.011 | 1281.011 | |
| 65 | 364 | 85.54477 | 370.4602 | 1.580857 | 73.90352 | 506.0238 | 684.7086 | |
| 66 | 362 | 86.16355 | 363.813 | 4.34375 | 88.63364 | 738.1676 | 832.8301 | |
| 67 | 60 | 86.95608 | 355.1887 | 3.410059 | 83.61319 | 652.0828 | 779.8803 | |
| 68 | 330 | 87.4833 | 349.3831 | 2.793369 | 79.54177 | 593.8293 | 746.5628 | |
| 69 | 357 | 87.73822 | 346.5564 | 7.203125 | 96.39479 | 978.6989 | 1015.303 | |
| 70 | 350 | 87.75165 | 346.4072 | 1.495749 | 70.19888 | 477.7334 | 680.5427 | |
| 71 | 73 | 87.86528 | 345.1428 | 6.487884 | 94.69099 | 915.3096 | 966.6279 | |

TABLE 1-continued

| Serial number | Calendar serial number | Daily smallest slope | Intercept | Temperature (° C.) | Relative humidity (%) | Steam partial pressure (Pa) | Saturation steam pressure (Pa) | Control line |
|---|---|---|---|---|---|---|---|---|
| 72 | 10 | 88.3588 | 339.6224 | 7.34375 | 96.4342 | 988.5695 | 1025.123 | 80% |
| 73 | 347 | 88.78866 | 334.7756 | 8.796875 | 98.61233 | 1115.917 | 1131.62 | |
| 74 | 61 | 88.89148 | 333.6109 | 1.346725 | 67.39811 | 453.793 | 673.3022 | |
| 75 | 98 | 88.89217 | 333.603 | 11.32436 | 100 | 1340.25 | 1340.25 | |
| 76 | 351 | 88.96956 | 332.7252 | 2.751771 | 77.59375 | 577.578 | 744.3615 | |
| 77 | 332 | 89.17719 | 330.3641 | 5.241731 | 89.99632 | 798.0234 | 886.729 | |
| 78 | 356 | 89.79758 | 323.2598 | 10.39063 | 99.74609 | 1256.336 | 1259.534 | |
| 79 | 56 | 90.35417 | 316.8236 | 2.276775 | 72.67638 | 523.0007 | 719.6296 | |
| 80 | 8 | 90.77331 | 311.9379 | 1.496313 | 65.8125 | 447.9003 | 680.5702 | |
| 81 | 9 | 91.68107 | 301.2426 | 2.437504 | 72.09103 | 524.7618 | 727.9156 | |
| 82 | 338 | 92.6408 | 289.7667 | 6.846929 | 93.27781 | 924.195 | 990.7983 | |
| 83 | 311 | 93.22705 | 282.6722 | 12.14326 | 100 | 1414.753 | 1414.753 | |
| 84 | 131 | 94.07806 | 272.2607 | 12.3002 | 100 | 1429.44 | 1429.44 | |
| 85 | 92 | 94.64234 | 265.2836 | 12.4036 | 100 | 1439.189 | 1439.189 | |
| 86 | 97 | 94.65686 | 265.1034 | 12.40625 | 100 | 1439.44 | 1439.44 | |
| 87 | 334 | 94.82118 | 263.0603 | 5.96875 | 88.91023 | 829.1782 | 932.6015 | |
| 88 | 349 | 94.98228 | 261.0524 | 2.328129 | 66.78363 | 482.3567 | 722.2679 | |
| 89 | 6 | 95.44976 | 255.1992 | 5.953129 | 88.42188 | 823.7331 | 931.5942 | |
| 90 | 359 | 95.56001 | 253.8131 | 3.953125 | 77.9619 | 631.7274 | 810.3028 | |
| 91 | 70 | 95.58762 | 253.4657 | 3.078129 | 71.9138 | 547.8303 | 761.7874 | |
| 92 | 118 | 96.04748 | 247.6575 | 12.6588 | 100 | 1463.504 | 1463.504 | |
| 93 | 305 | 96.36019 | 243.6865 | 12.4375 | 99.98438 | 1442.174 | 1442.399 | |
| 94 | 313 | 96.6567 | 239.9046 | 12.76847 | 100 | 1474.063 | 1474.063 | |
| 95 | 346 | 96.92231 | 236.5036 | 5.888586 | 87.06046 | 807.4358 | 927.4426 | |
| 96 | 62 | 97.93641 | 223.4023 | 6.149406 | 87.4375 | 825.6902 | 944.3205 | |
| 97 | 45 | 98.50394 | 215.9905 | 1.17991 | 50 | 332.6392 | 665.2783 | |
| 98 | 343 | 98.52571 | 215.7051 | 7.84375 | 93.20618 | 988.6599 | 1060.724 | |
| 99 | 117 | 98.59188 | 214.8369 | 13.11294 | 100 | 1507.667 | 1507.667 | |
| 100 | 39 | 99.18931 | 206.964 | 2.640621 | 63.5 | 468.9524 | 738.5077 | |
| 101 | 71 | 99.81741 | 198.6193 | 2.390625 | 60.3038 | 437.4982 | 725.4902 | |
| 102 | 91 | 100.5352 | 188.9979 | 13.45313 | 100 | 1541.512 | 1541.512 | |
| 103 | 106 | 100.5352 | 188.9979 | 13.45313 | 100 | 1541.512 | 1541.512 | |
| 104 | 84 | 101.0524 | 182.0105 | 4.855216 | 77.98438 | 673.1321 | 863.1627 | |
| 105 | 65 | 101.0766 | 181.6831 | 10.35938 | 97.76865 | 1228.863 | 1256.909 | |
| 106 | 47 | 101.5403 | 175.3769 | 2.609371 | 59.82813 | 440.8551 | 736.8692 | |
| 107 | 103 | 101.5437 | 175.3301 | 13.62746 | 100 | 1559.114 | 1559.114 | |
| 108 | 99 | 101.9841 | 169.3067 | 13.70313 | 100 | 1566.808 | 1566.808 | |
| 109 | 51 | 102.0222 | 168.7841 | 3.772159 | 69.25653 | 554.0872 | 800.0505 | |
| 110 | 40 | 102.1311 | 167.2883 | 4.440826 | 74.0625 | 621.0242 | 838.5136 | |
| 111 | 59 | 102.6449 | 160.2064 | 6.838638 | 87.07813 | 862.2775 | 990.2342 | |
| 112 | 78 | 103.6353 | 146.4272 | 13.98438 | 100 | 1595.702 | 1595.702 | |
| 113 | 48 | 103.7461 | 144.8744 | 3.515625 | 64.88396 | 509.8021 | 785.7137 | |
| 114 | 341 | 103.7665 | 144.5885 | 5.40907 | 78.73438 | 706.3317 | 897.107 | |
| 115 | 130 | 104.1749 | 138.8494 | 14.07547 | 100 | 1605.161 | 1605.161 | 70% |
| 116 | 342 | 104.2917 | 137.2024 | 6.517636 | 84.34277 | 816.9532 | 968.6108 | |
| 117 | 345 | 104.3811 | 135.9412 | 6.712666 | 85.22179 | 836.6208 | 981.6981 | |
| 118 | 119 | 104.8223 | 129.6937 | 14.18423 | 100 | 1616.517 | 1616.517 | |
| 119 | 83 | 105.1303 | 125.3125 | 9.528266 | 94.82144 | 1127.26 | 1188.824 | |
| 120 | 101 | 105.445 | 120.8211 | 14.28829 | 100 | 1627.45 | 1627.45 | |
| 121 | 136 | 107.6328 | 89.13644 | 14.64984 | 100 | 1665.941 | 1665.941 | |
| 122 | 302 | 107.807 | 86.581 | 13.87079 | 99.875 | 1581.996 | 1583.976 | |
| 123 | 50 | 107.9522 | 84.44508 | 5.784593 | 77.03125 | 709.2943 | 920.7878 | |
| 124 | 115 | 108.0405 | 83.14506 | 14.71652 | 100 | 1673.126 | 1673.126 | |
| 125 | 312 | 108.1499 | 81.53255 | 14.73438 | 100 | 1675.055 | 1675.055 | |
| 126 | 333 | 108.5451 | 75.69215 | 6.78125 | 82.30856 | 811.8402 | 986.3374 | |
| 127 | 319 | 109.5141 | 61.26402 | 14.95576 | 100 | 1699.131 | 1699.131 | |
| 128 | 137 | 109.5946 | 60.05896 | 14.96875 | 100 | 1700.553 | 1700.553 | |
| 129 | 303 | 109.9013 | 55.45639 | 13.89063 | 99.75426 | 1582.122 | 1586.019 | |
| 130 | 337 | 110.0876 | 52.65369 | 7.390625 | 84.26897 | 866.6351 | 1028.415 | |
| 131 | 322 | 110.2744 | 49.83746 | 15.07813 | 100 | 1712.569 | 1712.569 | |
| 132 | 114 | 110.3913 | 48.07184 | 15.09689 | 100 | 1714.637 | 1714.637 | |
| 133 | 93 | 111.3498 | 33.51612 | 15.25 | 100 | 1731.601 | 1731.601 | |
| 134 | 135 | 111.3498 | 33.51612 | 15.25 | 100 | 1731.601 | 1731.601 | |
| 135 | 325 | 111.6592 | 28.78631 | 15.29919 | 100 | 1737.082 | 1737.082 | |
| 136 | 105 | 112.0873 | 22.21759 | 15.36704 | 100 | 1744.668 | 1744.668 | |
| 137 | 95 | 112.7315 | 12.27726 | 9.781246 | 92.20734 | 1114.967 | 1209.195 | |
| 138 | 326 | 112.8048 | 11.14157 | 15.4803 | 100 | 1757.394 | 1757.394 | |
| 139 | 72 | 113.1607 | 5.61729 | 4.96875 | 65.34375 | 568.5082 | 870.0269 | |
| 140 | 57 | 113.4357 | 1.335736 | 6.671875 | 77.44778 | 758.1735 | 978.9481 | |
| 141 | 336 | 113.9874 | −7.28993 | 8.578125 | 87.06595 | 970.7762 | 1114.99 | |
| 142 | 323 | 114.083 | −8.79023 | 15.68055 | 100 | 1780.095 | 1780.095 | |
| 143 | 320 | 114.4359 | −14.3378 | 14.37797 | 99.6436 | 1631.089 | 1636.923 | |
| 144 | 344 | 115.0854 | −24.5983 | 7.46875 | 80.79129 | 835.3198 | 1033.923 | |
| 145 | 104 | 116.1476 | −41.5198 | 16 | 100 | 1816.842 | 1816.842 | 60% |
| 146 | 304 | 117.1179 | −57.1298 | 11.23097 | 94.46536 | 1258.257 | 1331.977 | |

TABLE 1-continued

| Serial number | Calendar serial number | Daily smallest slope | Intercept | Temperature (° C.) | Relative humidity (%) | Steam partial pressure (Pa) | Saturation steam pressure (Pa) | Control line |
|---|---|---|---|---|---|---|---|---|
| 147 | 335 | 117.2151 | −58.7012 | 10.56579 | 92.58475 | 1179.846 | 1274.341 | |
| 148 | 300 | 117.9696 | −70.9483 | 16.27794 | 100 | 1849.354 | 1849.354 | |
| 149 | 112 | 118.1369 | −73.6757 | 16.30328 | 100 | 1852.343 | 1852.343 | |
| 150 | 306 | 118.2025 | −74.7459 | 12.51569 | 96.89075 | 1404.746 | 1449.825 | |
| 151 | 263 | 118.8288 | −85.0007 | 0.710242 | 0 | 0 | #DIV/0! | |
| 152 | 262 | 118.879 | −85.826 | 0.717808 | 0 | 0 | #DIV/0! | |
| 153 | 307 | 119.2511 | −91.9487 | 8.34375 | 82.33429 | 903.545 | 1097.41 | |
| 154 | 353 | 119.8573 | −101.969 | 10.17458 | 90.03396 | 1117.754 | 1241.48 | |
| 155 | 90 | 120.9279 | −119.799 | 16.72156 | 100 | 1902.304 | 1902.304 | |
| 156 | 140 | 121.1452 | −123.438 | 16.75377 | 100 | 1906.2 | 1906.2 | |
| 157 | 301 | 121.2515 | −125.222 | 16.76952 | 100 | 1908.107 | 1908.107 | |
| 158 | 86 | 122.4523 | −145.481 | 6.789067 | 69.53125 | 686.1813 | 986.8675 | |
| 159 | 134 | 122.7101 | −149.857 | 16.98438 | 100 | 1934.298 | 1934.298 | |
| 160 | 2 | 123.793 | −168.349 | 10.125 | 87.71507 | 1085.359 | 1237.369 | |
| 161 | 85 | 124.175 | −174.913 | 6.440502 | 64.8875 | 625.1764 | 963.4774 | |
| 162 | 308 | 125.7153 | −201.594 | 10.21282 | 86.99111 | 1082.743 | 1244.659 | |
| 163 | 324 | 127.126 | −226.328 | 17.62193 | 100 | 2013.877 | 2013.877 | |
| 164 | 107 | 127.9414 | −240.755 | 17.7376 | 100 | 2028.618 | 2028.618 | |
| 165 | 298 | 128.1128 | −243.799 | 17.76183 | 100 | 2031.719 | 2031.719 | |
| 166 | 49 | 128.811 | −256.244 | 6.912762 | 63.78125 | 634.8068 | 995.2875 | |
| 167 | 87 | 128.8314 | −256.608 | 9.015625 | 78.79851 | 904.9763 | 1148.469 | |
| 168 | 58 | 129.9089 | −275.95 | 9.256626 | 79.40011 | 926.8275 | 1167.288 | |
| 169 | 142 | 129.9409 | −276.527 | 18.0186 | 100 | 2064.826 | 2064.826 | |
| 170 | 297 | 130.1436 | −280.185 | 18.04688 | 100 | 2068.501 | 2068.501 | |
| 171 | 340 | 130.2148 | −281.471 | 10.5593 | 85.88744 | 1094.026 | 1273.79 | |
| 172 | 316 | 130.561 | −287.735 | 10.4375 | 85.125 | 1075.539 | 1263.482 | |
| 173 | 154 | 131.3306 | −301.719 | 18.21175 | 100 | 2090.041 | 2090.041 | |
| 174 | 314 | 131.5113 | −305.016 | 9.549246 | 79.87263 | 950.8851 | 1190.502 | |
| 175 | 143 | 132.1105 | −315.974 | 18.3194 | 100 | 2104.21 | 2104.21 | |
| 176 | 153 | 132.1512 | −316.721 | 18.325 | 100 | 2104.95 | 2104.95 | |
| 177 | 158 | 132.5362 | −323.792 | 18.37793 | 100 | 2111.95 | 2111.95 | |
| 178 | 321 | 133.9551 | −350.024 | 11.23437 | 86.6994 | 1155.077 | 1332.278 | |
| 179 | 3 | 134.9181 | −367.983 | 9.625 | 77.77853 | 930.6805 | 1196.578 | |
| 180 | 157 | 135.0125 | −369.751 | 18.71527 | 100 | 2157.046 | 2157.046 | |
| 181 | 315 | 135.1352 | −372.05 | 10.43435 | 82.19065 | 1038.245 | 1263.216 | 50% |
| 182 | 151 | 135.4918 | −378.741 | 18.77995 | 100 | 2165.788 | 2165.788 | |
| 183 | 155 | 135.5291 | −379.443 | 18.78498 | 100 | 2166.469 | 2166.469 | |
| 184 | 109 | 135.6406 | −381.54 | 12.5625 | 90.96222 | 1322.851 | 1454.287 | |
| 185 | 149 | 135.7049 | −382.75 | 18.80866 | 100 | 2169.678 | 2169.678 | |
| 186 | 144 | 135.7334 | −383.287 | 18.8125 | 100 | 2170.199 | 2170.199 | |
| 187 | 148 | 135.8214 | −384.943 | 18.82543 | 100 | 2171.803 | 2171.803 | |
| 188 | 108 | 136.3105 | −394.173 | 13.8125 | 94.35588 | 1488.926 | 1577.989 | |
| 189 | 141 | 136.6145 | −399.925 | 18.93073 | 100 | 2186.287 | 2186.287 | |
| 190 | 42 | 136.6232 | −400.09 | 15.23438 | 97.20048 | 1681.436 | 1729.864 | |
| 191 | 294 | 137.8546 | −423.519 | 19.09205 | 100 | 2208.959 | 2208.959 | |
| 192 | 292 | 138.1487 | −429.145 | 18.84742 | 99.98534 | 2174.62 | 2174.939 | |
| 193 | 273 | 138.2381 | −430.857 | 19.14692 | 100 | 2215.977 | 2215.977 | |
| 194 | 339 | 138.4266 | −434.472 | 12.48438 | 89.4495 | 1294.198 | 1446.847 | |
| 195 | 156 | 139.3739 | −452.703 | 19.29688 | 100 | 2236.778 | 2236.778 | |
| 196 | 318 | 139.9593 | −464.029 | 16.65625 | 98.56388 | 1867.22 | 1894.426 | |
| 197 | 293 | 140.49 | −474.337 | 19.44325 | 100 | 2257.245 | 2257.245 | |
| 198 | 96 | 140.5093 | −474.712 | 12.15826 | 87.125 | 1233.821 | 1416.151 | |
| 199 | 111 | 140.9057 | −482.436 | 19.49751 | 100 | 2264.875 | 2264.875 | |
| 200 | 282 | 141.4999 | −494.051 | 19.57483 | 100 | 2275.785 | 2275.785 | |
| 201 | 295 | 141.7661 | −499.27 | 19.60938 | 100 | 2280.676 | 2280.676 | |
| 202 | 281 | 143.3201 | −529.919 | 19.81001 | 100 | 2309.254 | 2309.254 | |
| 203 | 129 | 143.863 | −540.699 | 14.47215 | 93.60938 | 1541.676 | 1646.925 | |
| 204 | 296 | 144.4832 | −553.061 | 19.95897 | 100 | 2330.674 | 2330.674 | |
| 205 | 64 | 144.5453 | −554.301 | 13.85938 | 91.57014 | 1449.375 | 1582.803 | |
| 206 | 150 | 144.6522 | −556.439 | 19.98053 | 100 | 2333.79 | 2333.79 | |
| 207 | 289 | 145.2022 | −567.453 | 20.05054 | 100 | 2343.93 | 2343.93 | |
| 208 | 63 | 145.3013 | −569.442 | 11.76563 | 82.65807 | 1140.645 | 1379.955 | |
| 209 | 160 | 146.6384 | −596.398 | 20.23232 | 100 | 2370.436 | 2370.436 | |
| 210 | 161 | 146.6997 | −597.641 | 20.24005 | 100 | 2371.57 | 2371.57 | |
| 211 | 162 | 148.9309 | −643.14 | 20.51939 | 100 | 2412.832 | 2412.832 | |
| 212 | 251 | 149.1327 | −647.286 | 20.54449 | 100 | 2416.569 | 2416.569 | |
| 213 | 272 | 151.3905 | −694.014 | 20.82326 | 100 | 2458.43 | 2458.43 | |
| 214 | 159 | 153.1208 | −730.251 | 21.03455 | 100 | 2490.578 | 2490.578 | |
| 215 | 179 | 154.0928 | −750.764 | 21.15235 | 100 | 2508.66 | 2508.66 | |
| 216 | 274 | 154.1251 | −751.448 | 21.15235 | 100 | 2509.261 | 2509.261 | |
| 217 | 299 | 154.3301 | −755.791 | 17.04351 | 96.5625 | 1874.819 | 1941.56 | |
| 218 | 132 | 157.1809 | −816.697 | 15.875 | 93.14063 | 1678.752 | 1802.384 | 40% |
| 219 | 165 | 158.2367 | −839.501 | 21.64766 | 100 | 2585.954 | 2585.954 | |
| 220 | 277 | 159.6919 | −871.144 | 21.81898 | 100 | 2613.171 | 2613.171 | |
| 221 | 164 | 160.8885 | −897.352 | 21.95889 | 100 | 2635.582 | 2635.582 | |

TABLE 1-continued

| Serial number | Calendar serial number | Daily smallest slope | Intercept | Temperature (° C.) | Relative humidity (%) | Steam partial pressure (Pa) | Saturation steam pressure (Pa) | Control line |
|---|---|---|---|---|---|---|---|---|
| 222 | 147 | 160.9731 | −899.21 | 21.96875 | 100 | 2637.167 | 2637.167 | |
| 223 | 116 | 161.4488 | −909.682 | 14.6766 | 87.51344 | 1460.443 | 1668.821 | |
| 224 | 127 | 161.9143 | −919.95 | 22.07813 | 100 | 2654.814 | 2654.814 | |
| 225 | 180 | 162.049 | −922.929 | 22.09375 | 100 | 2657.342 | 2657.342 | |
| 226 | 259 | 163.2668 | −949.935 | 22.23438 | 100 | 2680.202 | 2680.202 | |
| 227 | 261 | 163.7267 | −960.178 | 22.28726 | 100 | 2688.842 | 2688.842 | |
| 228 | 152 | 164.1978 | −970.696 | 22.3413 | 100 | 2697.696 | 2697.696 | |
| 229 | 270 | 166.2196 | −1016.12 | 22.57174 | 100 | 2735.742 | 2735.742 | |
| 230 | 317 | 166.4911 | −1022.26 | 14.875 | 86.0411 | 1454.364 | 1690.313 | |
| 231 | 124 | 166.5921 | −1024.55 | 22.61394 | 100 | 2742.759 | 2742.759 | |
| 232 | 145 | 167.3213 | −1041.07 | 19.3088 | 97.82813 | 2189.823 | 2238.439 | |
| 233 | 310 | 167.937 | −1055.08 | 15.82813 | 89.21279 | 1603.144 | 1796.989 | |
| 234 | 280 | 168.2182 | −1061.49 | 21.0597 | 99.47274 | 2481.277 | 2494.429 | |
| 235 | 260 | 168.3543 | −1064.59 | 22.8125 | 100 | 2775.99 | 2775.99 | |
| 236 | 177 | 168.9122 | −1077.35 | 22.875 | 100 | 2786.523 | 2786.523 | |
| 237 | 123 | 169.0795 | −1081.18 | 22.89371 | 100 | 2789.682 | 2789.682 | |
| 238 | 309 | 169.3881 | −1088.25 | 13.82066 | 79.36452 | 1253.028 | 1578.826 | |
| 239 | 163 | 170.2015 | −1106.95 | 23.01877 | 100 | 2810.883 | 2810.883 | |
| 240 | 176 | 170.2245 | −1107.48 | 22.34375 | 99.92188 | 2695.991 | 2698.098 | |
| 241 | 120 | 170.2577 | −1108.24 | 15.4375 | 86.76293 | 1520.585 | 1752.575 | |
| 242 | 276 | 170.5408 | −1114.77 | 23.05644 | 100 | 2817.298 | 2817.298 | |
| 243 | 288 | 171.1145 | −1128.02 | 19.8125 | 97.94956 | 2262.254 | 2309.611 | |
| 244 | 184 | 171.7602 | −1142.98 | 23.19135 | 100 | 2840.372 | 2840.372 | |
| 245 | 88 | 171.9634 | −1147.7 | 10.90625 | 55.83372 | 727.8264 | 1303.561 | |
| 246 | 275 | 172.0993 | −1150.85 | 23.22872 | 100 | 2846.793 | 2846.793 | |
| 247 | 287 | 174.9515 | −1217.59 | 17.70313 | 92.87761 | 1880.044 | 2024.216 | |
| 248 | 139 | 175.8027 | −1237.68 | 18.13538 | 93.77779 | 1950.615 | 2080.039 | |
| 249 | 286 | 176.6863 | −1258.61 | 18.08075 | 93.39838 | 1936.065 | 2072.91 | |
| 250 | 285 | 176.9987 | −1266.03 | 17.23438 | 90.8125 | 1784.618 | 1965.168 | |
| 251 | 185 | 177.4982 | −1277.92 | 23.81553 | 100 | 2949.293 | 2949.293 | |
| 252 | 193 | 178.4566 | −1300.81 | 23.91813 | 100 | 2967.54 | 2967.54 | |
| 253 | 110 | 178.6889 | −1306.37 | 14.85543 | 79.86695 | 1348.3 | 1688.183 | |
| 254 | 181 | 178.7625 | −1308.13 | 23.95078 | 100 | 2973.369 | 2973.369 | |
| 255 | 291 | 178.7812 | −1308.58 | 19.67526 | 96.46875 | 2209.159 | 2290.026 | |
| 256 | 189 | 179.5138 | −1326.17 | 24.03076 | 100 | 2987.687 | 2987.687 | |
| 257 | 283 | 180.3543 | −1346.41 | 15.62241 | 82.9766 | 1471.572 | 1773.478 | |
| 258 | 284 | 181.7828 | −1380.99 | 15.70313 | 82.70313 | 1474.324 | 1782.671 | |
| 259 | 183 | 182.1155 | −1389.08 | 24.3056 | 100 | 3037.348 | 3037.348 | |
| 260 | 258 | 182.1177 | −1389.13 | 22.1383 | 99.17886 | 2642.686 | 2664.566 | |
| 261 | 268 | 182.2469 | −1392.28 | 20.17188 | 96.72839 | 2284.332 | 2361.594 | |
| 262 | 186 | 183.2489 | −1416.71 | 24.42429 | 100 | 3059.016 | 3059.016 | |
| 263 | 100 | 183.2984 | −1417.92 | 16.98195 | 87.64063 | 1694.97 | 1934.001 | |
| 264 | 113 | 185.1599 | −1463.6 | 18.70551 | 92.79449 | 2000.398 | 2155.73 | |
| 265 | 128 | 188.2182 | −1539.42 | 17.18001 | 86.51938 | 1694.411 | 1958.418 | |
| 266 | 146 | 192.0719 | −1636.33 | 20.69022 | 95.875 | 2337.791 | 2438.374 | |
| 267 | 188 | 192.7106 | −1652.53 | 25.39177 | 100 | 3240.733 | 3240.733 | |
| 268 | 271 | 193.1265 | −1663.11 | 25.43337 | 100 | 3248.753 | 3248.753 | |
| 269 | 187 | 193.3417 | −1668.58 | 25.45487 | 100 | 3252.905 | 3252.905 | |
| 270 | 174 | 193.6375 | −1676.12 | 25.48438 | 100 | 3258.611 | 3258.611 | |
| 271 | 173 | 195.6194 | −1726.85 | 25.68117 | 100 | 3296.887 | 3296.887 | |
| 272 | 278 | 195.8468 | −1732.69 | 22.85613 | 98.57488 | 2743.673 | 2783.339 | |
| 273 | 191 | 196.6339 | −1752.96 | 25.78125 | 100 | 3316.502 | 3316.502 | |
| 274 | 192 | 197.6676 | −1779.68 | 25.88279 | 100 | 3336.508 | 3336.508 | |
| 275 | 197 | 198.0668 | −1790.03 | 25.92188 | 100 | 3344.238 | 3344.238 | |
| 276 | 196 | 198.5463 | −1802.47 | 25.96875 | 100 | 3353.526 | 3353.526 | |
| 277 | 266 | 198.9982 | −1814.22 | 19.82532 | 92.20402 | 2131.247 | 2311.447 | |
| 278 | 200 | 199.2229 | −1820.07 | 26.03472 | 100 | 3366.638 | 3366.638 | |
| 279 | 239 | 199.5084 | −1827.52 | 26.0625 | 100 | 3372.173 | 3372.173 | |
| 280 | 190 | 200.6014 | −1856.07 | 26.16855 | 100 | 3393.375 | 3393.375 | |
| 281 | 194 | 201.7295 | −1885.67 | 26.27749 | 100 | 3415.275 | 3415.275 | |
| 282 | 290 | 201.769 | −1886.71 | 22.44378 | 97.32177 | 2641.856 | 2714.558 | |
| 283 | 279 | 202.5375 | −1906.94 | 21.8777 | 96.25869 | 2524.438 | 2622.556 | |
| 284 | 178 | 202.9393 | −1917.55 | 21.90625 | 96.24742 | 2528.545 | 2627.13 | |
| 285 | 265 | 205.571 | −1987.37 | 20.09718 | 91.21532 | 2144.204 | 2350.706 | |
| 286 | 89 | 206.1881 | −2003.84 | 14.01563 | 55.47123 | 886.9526 | 1598.941 | |
| 287 | 175 | 210.3253 | −2115.17 | 27.09124 | 100 | 3582.803 | 3582.803 | |
| 288 | 166 | 211.0994 | −2136.18 | 23.01563 | 96.87193 | 2722.44 | 2810.35 | |
| 289 | 269 | 211.1592 | −2137.8 | 23.58117 | 97.71875 | 2841.638 | 2907.976 | |
| 290 | 43 | 211.6431 | −2150.97 | 18.83601 | 84.47691 | 1836.013 | 2173.39 | |
| 291 | 44 | 211.6431 | −2150.97 | 18.83601 | 84.47691 | 1836.013 | 2173.39 | |
| 292 | 201 | 213.2242 | −2194.13 | 27.35938 | 100 | 3639.552 | 3639.552 | |
| 293 | 267 | 213.9286 | −2213.43 | 20.23657 | 89.24563 | 2116.067 | 2371.059 | |
| 294 | 256 | 214.2838 | −2223.19 | 20.80912 | 91.04224 | 2236.263 | 2456.292 | |
| 295 | 195 | 214.4162 | −2226.82 | 27.46875 | 100 | 3662.922 | 3662.922 | |
| 296 | 220 | 216.614 | −2287.44 | 27.66908 | 100 | 3706.069 | 3706.069 | |

TABLE 1-continued

| Serial number | Calendar serial number | Daily smallest slope | Intercept | Temperature (° C.) | Relative humidity (%) | Steam partial pressure (Pa) | Saturation steam pressure (Pa) | Control line |
|---|---|---|---|---|---|---|---|---|
| 297 | 252 | 217.3137 | −2306.83 | 22.92499 | 95.72197 | 2675.403 | 2794.973 | |
| 298 | 126 | 217.9015 | −2323.16 | 23.53813 | 96.75438 | 2806.306 | 2900.444 | |
| 299 | 219 | 219.9737 | −2380.96 | 27.97205 | 100 | 3772.162 | 3772.162 | |
| 300 | 133 | 220.8943 | −2406.75 | 18.04688 | 76.37039 | 1579.722 | 2068.501 | |
| 301 | 224 | 222.8132 | −2460.78 | 28.2251 | 100 | 3828.149 | 3828.149 | |
| 302 | 264 | 223.6313 | −2483.91 | 19 | 80.3933 | 1765.246 | 2195.762 | |
| 303 | 226 | 228.4749 | −2622.06 | 28.72169 | 100 | 3940.125 | 3940.125 | |
| 304 | 170 | 229.3909 | −2648.42 | 24.04355 | 95.89063 | 2867.112 | 2989.981 | |
| 305 | 248 | 230.5952 | −2683.18 | 24.9375 | 97.25492 | 3067.683 | 3154.27 | |
| 306 | 257 | 236.4768 | −2854.74 | 22.96875 | 91.96452 | 2577.202 | 2802.387 | |
| 307 | 122 | 239.7242 | −2950.72 | 18.84105 | 72.0598 | 1566.633 | 2174.074 | |
| 308 | 247 | 241.7181 | −3010.08 | 23.73671 | 92.93517 | 2727.963 | 2935.34 | |
| 309 | 198 | 242.5653 | −3035.41 | 23.99675 | 93.44074 | 2786.02 | 2981.591 | |
| 310 | 168 | 244.8469 | −3103.9 | 22.98438 | 90 | 2524.536 | 2805.04 | |
| 311 | 215 | 247.0028 | −3169.02 | 25.43033 | 95.8269 | 3112.617 | 3248.166 | |
| 312 | 167 | 247.7684 | −3192.23 | 23.0625 | 89.51221 | 2522.75 | 2818.33 | |
| 313 | 125 | 252.0047 | −3321.54 | 18.03366 | 59.19832 | 1223.5 | 2066.782 | |
| 314 | 169 | 257.0227 | −3476.56 | 24.22162 | 90.97703 | 2749.414 | 3022.097 | |
| 315 | 182 | 257.4862 | −3490.98 | 26.47804 | 96.26881 | 3326.97 | 3455.917 | |
| 316 | 172 | 257.8592 | −3502.59 | 25.98732 | 95.28125 | 3198.794 | 3357.213 | |
| 317 | 255 | 258.8518 | −3533.56 | 24.56506 | 91.58325 | 2825.243 | 3084.891 | |
| 318 | 138 | 261.9355 | −3630.25 | 18.375 | 56.09375 | 1184.454 | 2111.562 | |
| 319 | 249 | 263.2932 | −3673.05 | 25.66988 | 93.67188 | 3086.189 | 3294.68 | |
| 320 | 229 | 267.1654 | −3795.91 | 27.63657 | 97 | 3588.066 | 3699.037 | |
| 321 | 217 | 267.2616 | −3798.98 | 27.64389 | 97.00327 | 3589.722 | 3700.62 | |
| 322 | 238 | 268.8758 | −3850.55 | 26.45649 | 94.54688 | 3263.312 | 3451.528 | |
| 323 | 121 | 272.0565 | −3952.73 | 19.15625 | 56.81666 | 1259.777 | 2217.266 | |
| 324 | 253 | 272.8898 | −3979.63 | 24.65868 | 88.6382 | 2749.738 | 3102.204 | |
| 325 | 221 | 273.61 | −4002.92 | 27.8125 | 96.52786 | 3607.467 | 3737.229 | |
| 326 | 199 | 275.1793 | −4053.79 | 25.10938 | 89.63674 | 2856.494 | 3186.745 | |
| 327 | 234 | 276.7621 | −4105.3 | 29.1367 | 98.09356 | 3958.941 | 4035.883 | |
| 328 | 222 | 277.1958 | −4119.44 | 27.71875 | 95.90625 | 3564.676 | 3716.834 | |
| 329 | 240 | 277.3032 | −4122.94 | 23.58669 | 83.12147 | 2417.956 | 2908.942 | |
| 330 | 223 | 279.2247 | −4185.79 | 29.07813 | 97.80199 | 3933.839 | 4022.248 | |
| 331 | 171 | 279.2997 | −4188.25 | 26.16364 | 91.95067 | 3119.326 | 3392.391 | |
| 332 | 218 | 279.8991 | −4207.92 | 27.84759 | 95.78509 | 3587.043 | 3744.887 | |
| 333 | 225 | 284.3034 | −4353.21 | 28.07813 | 95.64149 | 3630.115 | 3795.545 | |
| 334 | 209 | 286.0972 | −4412.78 | 25.4375 | 88.19028 | 2865.787 | 3249.55 | |
| 335 | 216 | 292.6851 | −4633.56 | 28.54688 | 95.42574 | 3721.973 | 3900.387 | |
| 336 | 237 | 295.2136 | −4719.12 | 25.82471 | 87.37606 | 2905.299 | 3325.051 | |
| 337 | 241 | 297.2034 | −4786.76 | 22.59375 | 70.42413 | 1929.198 | 2739.4 | |
| 338 | 230 | 301.8931 | −4947.27 | 27.87842 | 92.48438 | 3469.67 | 3751.628 | |
| 339 | 214 | 303.4541 | −5001.04 | 28.16556 | 92.96875 | 3546.676 | 3814.912 | |
| 340 | 228 | 306.1504 | −5094.29 | 28.15954 | 92.49013 | 3527.181 | 3813.576 | |
| 341 | 236 | 306.7076 | −5113.63 | 27.4974 | 90.51303 | 3320.982 | 3669.065 | |
| 342 | 243 | 309.8065 | −5221.54 | 23.04688 | 68.15625 | 1919.054 | 2815.669 | |
| 343 | 231 | 314.7692 | −5395.69 | 27.96875 | 90.39063 | 3409.025 | 3771.436 | |
| 344 | 250 | 317.972 | −5508.96 | 24.89063 | 76.5 | 2406.281 | 3145.465 | |
| 345 | 212 | 319.3398 | −5557.54 | 29.75057 | 94.3125 | 3943.428 | 4181.236 | |
| 346 | 235 | 321.5842 | −5637.52 | 29.13747 | 92.49716 | 3733.244 | 4036.063 | |
| 347 | 242 | 323.7226 | −5714.02 | 23.31664 | 64.09758 | 1834.44 | 2861.95 | |
| 348 | 208 | 332.7491 | −6040.22 | 28.96582 | 90.05669 | 3598.857 | 3996.213 | |
| 349 | 254 | 333.0444 | −6050.97 | 26.39454 | 79.68351 | 2740.272 | 3438.946 | |
| 350 | 233 | 333.1996 | −6056.63 | 29.98438 | 92.84072 | 3934.388 | 4237.782 | |
| 351 | 207 | 335.7654 | −6150.37 | 29.20644 | 90.2519 | 3657.163 | 4052.173 | |
| 352 | 232 | 337.4056 | −6210.52 | 29.72951 | 91.49641 | 3821.05 | 4176.175 | |
| 353 | 246 | 337.6788 | −6220.55 | 26.08664 | 76.68187 | 2589.539 | 3376.989 | |
| 354 | 227 | 345.0467 | −6492.92 | 28.88424 | 87.33098 | 3473.467 | 3977.394 | |
| 355 | 202 | 349.1711 | −6646.84 | 29.21687 | 87.68938 | 3555.464 | 4054.612 | |
| 356 | 244 | 349.4851 | −6658.6 | 24.716 | 63.61211 | 1980.147 | 3112.846 | |
| 357 | 213 | 355.6699 | −6891.48 | 29.47995 | 87.32813 | 3594.955 | 4116.606 | |
| 358 | 245 | 396.6812 | −8492.3 | 26.83178 | 61.00569 | 2152.664 | 3528.628 | |
| 359 | 211 | 405.6491 | −8854.92 | 30.06905 | 78.50327 | 3343 | 4258.422 | |
| 360 | 206 | 436.1194 | −10118.9 | 31.33078 | 77.5053 | 3547.051 | 4576.527 | |
| 361 | 210 | 439.7628 | −10273.3 | 31.57491 | 77.88144 | 3614.013 | 4640.403 | |
| 362 | 203 | 444.9771 | −10495.3 | 31.65625 | 77.03406 | 3591.218 | 4661.857 | |
| 363 | 205 | 466.0037 | −11404.4 | 32.07514 | 74.21577 | 3542.847 | 4773.713 | |
| 364 | 204 | 486.8092 | −12324.8 | 32.15625 | 69.45763 | 3330.936 | 4795.638 | |

Figure 6:
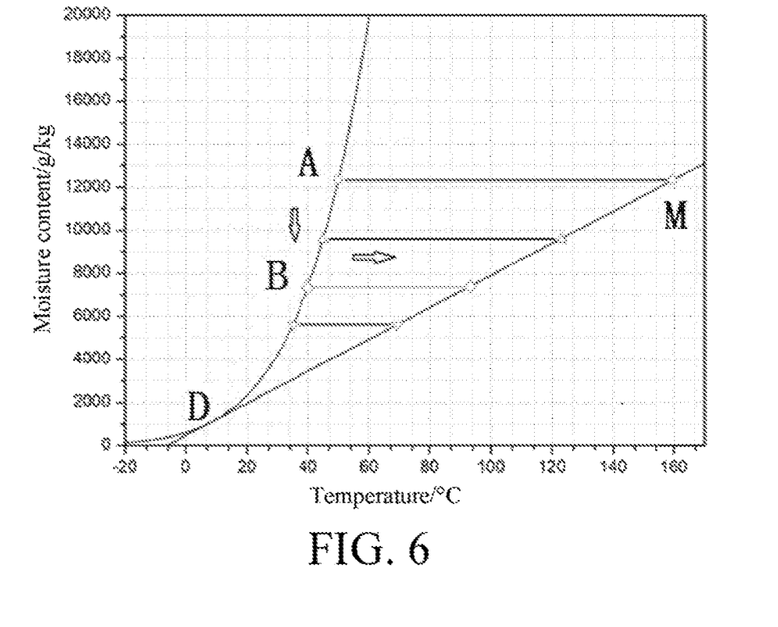
FIG. 6 is a white plume temperature lowering and temperature rise control path

Second Step, condensing and temperature rise capability of a desulfurization tower device is designed, Definition: a critical point D is a smoke parameter point of an intersection point of the control lines with different values and the saturated air enthalpy humidity curve;

Critical point calculation:

Definition: a point A is a smoke parameter point of an initial state of a wet desulphurization device for emitting wet smoke;

Definition: a point B is any one smoke parameter point between the point A and the critical meteorological point D in the saturated air enthalpy humidity curve, and this point is the smoke parameter design point with the lowest device operation energy consumption; and the parameter design point with the lowest device operation energy consumption is a lowest cost combination of the cost required for temperature lowering of the device to the point B and the cost required for temperature rise of the device to the control lines (point E) with different values from the point B;

Definition: the condensation capability of the desulphurization tower device refers to temperature required for temperature lowering from the point A to the point B in the saturated air enthalpy humidity curve; and the temperature rise capability of the desulphurization tower device refers to temperature required for temperature rise of the point B in the saturated air enthalpy humidity curve to the control lines with different values;

FIG. 6 gives the white plume temperature lowering and temperature rise control path, and various different temperature lowering and temperature rise options are provided for paths to reach the same control lines, and Table 2 gives the quantitative result summary of the options. Therefore, under the same control conditions, the temperature rise is smaller if the temperature lowering is greater, and vice versa.

If the outlet smoke temperature of a desulfurization tower is 50° C., when direct temperature rise is adopted, the temperature rise amplitude of the 100% control line is about 196° C., the temperature rise amplitude of the 90% control line is about 109.6° C., the temperature rise amplitude of the 80% control line is about 85° C., and energy consumption differences are great;

after the condensation for 2° C., namely the smoke emission temperature is lowered to 48° C., the temperature rise amplitude of the 100% control line is about 173° C., the temperature rise amplitude of the 90% control line is about 95.8° C., the temperature rise amplitude of the 80% control line is about 73.9° C., compared with those in a direct temperature rise method, the temperature rise values are respectively reduced by 23° C., 13.8° C. and 11.1° C., and are respectively 11.5, 6.9 and 5.55 times of the temperature lowering amplitudes, and the influence of the temperature lowering on the temperature rise amplitude is obvious, particularly on the 100% control line;

after the condensation for 5° C., namely the smoke emission temperature is lowered to 45° C., the temperature rise amplitude of the 100% control line is about 143° C., the temperature rise amplitude of the 90% control line is about 77° C., the temperature rise amplitude of the 80% control line is about 59° C., compared with those of the direct temperature rise method, the temperature rise values are respectively reduced by 52° C., 32° C. and 26° C., and are respectively 10.5, 6.4 and 5.2 times of the temperature lowering amplitudes;

after the condensation for 10° C., namely the smoke emission temperature is lowered to 40° C., the temperature rise amplitude of the 100% control line is about 102° C., the temperature rise amplitude of the 90% control line is about 52.83° C., the temperature rise amplitude of the 80% control line is about 39.29° C., compared with those of the direct temperature rise method, the temperature rise values are respectively reduced by 94° C., 56° C. and 45° C., and are respectively 9.4, 5.6 and 4.5 times of the temperature lowering amplitude; after the condensation for 15° C., the conclusion is similar; after the condensation for 20° C., namely the smoke emission temperature is lowered to 30° C., the temperature rise amplitude of the 100% control line is about 46° C., the temperature rise amplitude of the 90% control line is about 20.6° C., the temperature rise amplitude of the 80% control line is about 14° C., compared with those of the direct temperature rise method, the temperature rise values are respectively reduced by 149° C., 88.9° C. and 71° C., and are respectively 7.5, 4.4 and 3.5 times of the temperature lowering amplitudes; and therefore, the temperature rise amplitude is obviously reduced when the temperature is lowered to a low degree.

TABLE 2

White Plume Control Path Analysis

| Temperature lowering to/° C. | Temperature rise to/° C. | | |
|---|---|---|---|
| | 100% white-plume-free control line | 90% white-plume-free control line | 80% white-plume-free control line |
| 50 | 246.1017 | 159.5924 | 135.1645 |
| 49 | 233.5251 | 151.5271 | 128.415 |
| 48 | 221.4764 | 143.8005 | 121.9488 |
| 47 | 209.9374 | 136.4008 | 115.7562 |
| 46 | 198.8903 | 129.3165 | 109.8276 |
| 45 | 188.3178 | 122.5364 | 104.1536 |
| 44 | 178.2029 | 116.0499 | 98.72523 |
| 43 | 168.5292 | 109.8464 | 93.53366 |
| 42 | 159.2808 | 103.9155 | 88.5703 |
| 41 | 150.442 | 98.24737 | 83.82683 |
| 40 | 141.9979 | 92.8323 | 79.29513 |
| 39 | 133.9338 | 87.66088 | 74.96732 |
| 38 | 126.2353 | 82.72396 | 70.83577 |
| 37 | 118.8886 | 78.01266 | 66.89303 |
| 36 | 111.8803 | 73.51837 | 63.1319 |
| 35 | 105.1974 | 69.23272 | 59.54537 |
| 34 | 98.82716 | 65.14759 | 56.12665 |
| 33 | 92.75734 | 61.25512 | 52.86916 |
| 32 | 86.97605 | 57.54767 | 49.76652 |
| 31 | 81.47176 | 54.01786 | 46.81253 |

The concrete condensing and temperature rise point determination needs to be performed after the technical and economic comparison according to the local meteorological conditions, control requirements and cold and heat source conditions. Specifically, a function is defined to be F(Xb)=F1(XB)+F2(XB)

wherein F1(Xb) is an energy consumption function meeting the requirement of A→B

F2(Xb) is an energy consumption function meeting the requirement of B→N the solved smallest value of F(Xb) is a final regulating mode.

Figure 8:
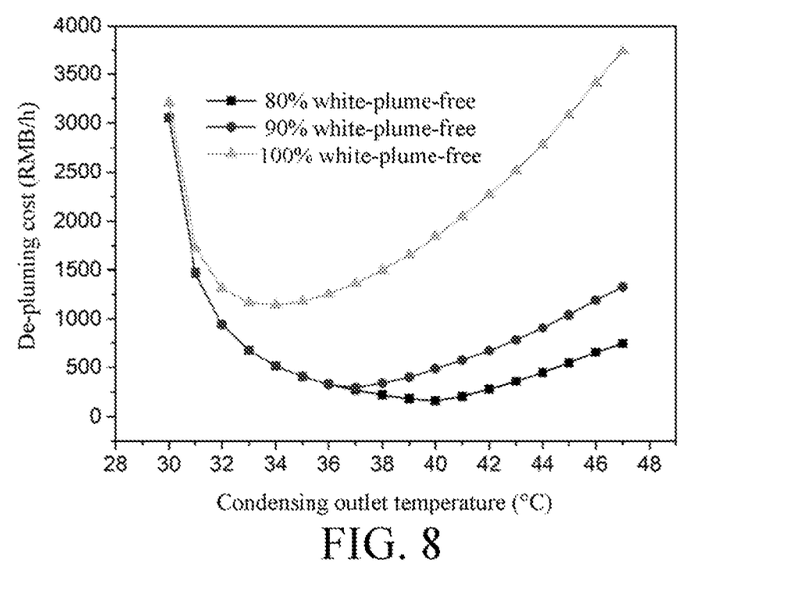
FIG. 8 is comparison curves of operation energy consumptions under the condition of different combinations.

For data in this example, if the electric charge is 0.245 RMB/KWH, and the steam charge is 125.73 RMB/ton, an operation energy consumption comparison curve under different combinations can be calculated, as shown in FIG. 8, and the smallest value is selected as the optimum value.

In the present example, the optimum condensing temperature of the 100% control line is 34° C., the optimum condensing temperature of the 90% control line is 37° C., and the optimum condensing temperature of the 80% control line is 40° C. If the 80% control line is taken as a design point in the present example, the designed condensation capability is temperature lowering from 50° C. to 40° C., the temperature rise capability is temperature rise from 40° C. to 79.29° C., certain margin is generally left for the design point, for example, the temperature lowering capability is designed to 38° C., and the temperature rise capability is designed to be 80° C.

Figure 9:
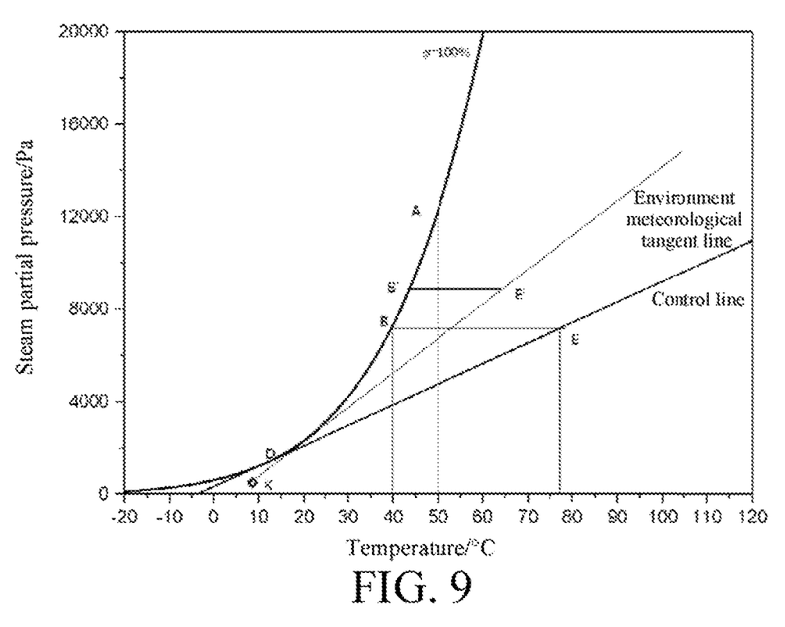
FIG. 9 is a diagram obtained by drawing tangent lines on the saturated air enthalpy humidity curve by using environment meteorological points K.

Third Step, a method for regulating white plume of smoke after wet desulphurization by the control lines, wherein the method concretely includes the following steps of:

S1, a tangent line is drawn on the saturated air enthalpy humidity curve by using an environment meteorological point K, wherein the tangent line is an environment meteorological tangent line (as shown in FIG. 9); and S2, a point B' is taken as a smoke parameter point with the lowest device operation energy consumption, wherein the point B' is any one meteorological data point between the point A and the critical meteorological point D in the saturated air enthalpy humidity curve.

The smoke parameter point with the lowest device operation energy consumption is the lowest cost combination of the cost required for temperature lowering of the device to the point B' and the cost required for temperature rise of the device from the point B' to the environment meteorological tangent line.

The operation work condition of the device is regulated according to the above determined optimum points to achieve the objective of energy saving.

Still taking the data in the above case as an example, a tangent line is drawn on the saturation curve by using the environment meteorological point K (at the temperature being 8° C. and the relative humidity being 78%) to obtain an environment meteorological tangent line, at the moment, the white-plume-free control objective can be achieved only by condensing the smoke from A to B' and then raising the temperature to E'. In order to obtain the most economic and reasonable point B', the condensing-temperature rise combined energy consumption calculation is performed, the condensing-temperature rise combination point with the lowest energy consumption is obtained, and the calculation method is identical to that in the previous step. In the present example, the optimum point B' is 44° C., and the E' is 65° C.

Therefore, the smoke condensing-temperature rise combination control point can be regulated by obtaining the environment temperature and humidity conditions in real time, so as to realize the optimum operation energy consumption.

What is claimed is:

1. A method for controlling smoke plume emissions, comprising the following steps of:
   Step 1, drawing a saturated air enthalpy humidity curve or an equivalent curve;
   Step 2, obtaining temperature and relative humidity change data of located geographic areas along with a time at a frequency of at least one datum every day, where a sum of data collected every day is p, a data collection day number is m, and a sum of collected data is m*p;
   Step 3, drawing the data obtained in the Step 2 in the curve obtained in the Step 1, and correspondingly obtaining corresponding meteorological points;
   Step 4, drawing tangent lines on the curve by using the meteorological points obtained in the Step 3;
   Step 5, ranking a slope of each tangent line obtained in the Step 4 in an increasing order, where serial numbers are sequentially 0, 1, 2, . . . , m*p-1, a serial number of a magnitude of any one slope is defined to be n, and n is greater than or equal to 0 but smaller than or equal to m*p-1;
   Step 6, determining a white plume control line after wet desulphurization according to the slopes obtained in the Step 5; and
   Step 7, controlling the smoke plume emissions using the determined control line,
   wherein according to (m*p-n)/(m*p)*100, control lines with different values can be obtained, the tangent line with a smallest slope is a strictest white plume control line, a de-pluming day number control region corresponding to a smoke state is a 100% white-plume-free day number control region, and the corresponding tangent line is a 100% white-plume-free day number control line.

2. The method according to claim 1, wherein the saturated air enthalpy humidity curve in the Step 1 takes temperature as a horizontal coordinate, and takes steam partial pressure as a vertical coordinate; and the equivalent curve is a curve drawn by taking temperature as the horizontal coordinate and taking relative humidity or moisture content as the vertical coordinate.

3. The method according to claim 1, wherein a data collection time in the Step 2 is longer than or equal to 1 calendar year.

4. The method according to claim 3, wherein the data collection time in the Step 2 is 1 to 5 calendar years.

5. The method according to claim 1, wherein a data collection time in the Step 2 is from October of each year to April of next year.

6. The method according to claim 1, wherein p data are collected every day in Step 2, p is greater than or equal to 1, and a collection time interval of each datum is (24/p)h.

7. The method according to claim 1, wherein p data are collected every day in Step 2, and p is greater than or equal to 20 but smaller than or equal to 80.

8. The method according to claim 4, wherein p data collected every day in Step 2 are screened by a method with the following steps:
   Step a, drawing the curve or the equivalent curve;
   Step b, drawing the p data collected every day into the saturated air enthalpy humidity curve obtained in the Step a to obtain corresponding meteorological points;
   Step c, drawing tangent lines on the curve by using the meteorological points obtained in the Step b; and
   Step d, ranking the slope of each tangent line obtained in the Step c in an increasing order, and selecting the meteorological point datum with the smallest slope as the datum of that day.

9. The method according to claim 1, wherein a region where the tangent line and a right lower side of the tangent line are located is a de-pluming control region, and de-pluming can be realized when original smoke enters the geographic area after temperature and humidity regulation; a region defined by the de-pluming control line and the saturation curve at a low-temperature side forms the de-pluming day number control region, and a point number falling within the de-pluming day number control region is the white plume generating day number; and the de-pluming for the day number at different proportions can be realized by regulating different slopes.

10. The method according to claim 1, wherein process design is performed according to the control lines with different values obtained through calculation, and the process design is to regulate the smoke state to the corresponding control line in a condensing or temperature rise mode.

11. The method according to claim 5, wherein p data are collected every day in Step 2, and p is greater than or equal to 20 but smaller than or equal to 80.

* * * * *